(12) United States Patent
Jung

(10) Patent No.: US 12,711,815 B2
(45) Date of Patent: Aug. 18, 2026

(54) SERVICE PROCESSING DEVICE OF VEHICLE CONTROLLER AND METHOD THEREOF

(71) Applicants: Hyundai Motor Company, Seoul (KR); Kia Corporation, Seoul (KR)

(72) Inventor: Woo Suk Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 285 days.

(21) Appl. No.: 18/383,868

(22) Filed: Oct. 25, 2023

(65) Prior Publication Data

US 2025/0014394 A1 Jan. 9, 2025

(30) Foreign Application Priority Data

Jul. 7, 2023 (KR) ........................ 10-2023-0088447

(51) Int. Cl.
*G07C 5/00* (2006.01)
*H04W 28/08* (2023.01)

(52) U.S. Cl.
CPC ........ *G07C 5/008* (2013.01); *H04W 28/0967* (2020.05)

(58) Field of Classification Search
CPC ........................... G07C 5/008; H04W 28/0967
See application file for complete search history.

(56) References Cited

U.S. PATENT DOCUMENTS 10,750,339 B2 * 8/2020 Prabhudeva .......... H04L 67/125
2010/0085940 A1 * 4/2010 Murphy .............. H04L 61/5014 370/411
2015/0222553 A1 * 8/2015 Macdonald ............ H04W 4/40 370/230.1
2018/0103413 A1 * 4/2018 Hosey ................... H04W 48/04
2018/0159824 A1 * 6/2018 Youtz ................ H04W 28/0268
2019/0057217 A1 * 2/2019 Link ..................... H04W 88/06
2021/0092019 A1 * 3/2021 Fang ..................... H04W 12/37
2021/0192867 A1 * 6/2021 Fang .................... G07C 5/0816
2023/0370822 A1 * 11/2023 Lei .......................... H04W 4/44
2025/0014394 A1 * 1/2025 Jung ................. H04W 28/0967

FOREIGN PATENT DOCUMENTS

DE 102019100436 A1 * 7/2019 ............ H04L 67/02
KR 20250008317 A * 1/2025 ............ H04L 43/08

* cited by examiner

*Primary Examiner* — James R Sheleheda
(74) *Attorney, Agent, or Firm* — Banner & Witcoff, Ltd.

(57) ABSTRACT

Disclosed is a service processing device for a vehicle controller, and a method thereof. The service processing device of a vehicle controller includes a plurality of access point names (APNs) that communicates with a server, and a controller that allocates dynamic internet protocol (IP) addresses for services provided by the vehicle controller and to, when receiving data of a service having a dynamic IP address, deliver the data to an APN corresponding to the dynamic IP address.

18 Claims, 7 Drawing Sheets

SERVICE PROCESSING DEVICE OF VEHICLE CONTROLLER AND METHOD THEREOF

CROSS-REFERENCE TO RELATED APPLICATION

This application claims the benefit of priority to Korean Patent Application No. 10-2023-0088447, filed in the Korean Intellectual Property Office on Jul. 7, 2023, the entire contents of which are incorporated herein by reference.

TECHNICAL FIELD

The present disclosure relates to a technology for efficiently processing services that are provided by various applications mounted on a vehicle controller.

BACKGROUND

As vehicle parts have been rapidly becoming digitalized, the kinds and the number of electronic devices mounted on a vehicle have been increased. The electronic devices may be used largely for power train control systems, body control systems, chassis control systems, vehicle networks, and multimedia systems.

The power train control systems may include an engine control system and an automatic transmission control system. The body control systems may include a body electric-part control system, a convenience device control system, and a lamp control system. The chassis control systems may include a steering device control system, a brake control system, and a suspension control system. The vehicle networks may include a controller area network (CAN), a FlexRay-based network, and a media oriented system transport (MOST)-based network. The multimedia systems may include a navigation device system, a telematics system, and an infotainment system.

The electronic device mounted on the systems may be connected to each other through a vehicle network. As a vehicle network for supporting functions of the electronic devices, the CAN may support a transmission rate of a maximum of 1 Mbps, and may support automatic retransmission of frames that collide, or an error detection based on cycle redundancy check (CRC). The FlexRay-based network may support a transmission rate of a maximum of 10 Mbps, and may support simultaneous transmission of data through two channels or transmission of data in a synchronous scheme. The MOST-based network may provide a communication network for multimedia of a high quality, and may support a transmission rate of a maximum of 150 Mbps.

Meanwhile, the telematics system, the infotainment system, and the various safety systems provided in the vehicle may require a high transmission rate and an expansion of systems, but the CAN or the FlexRay-based network may not support them sufficiently. However, the MOST-based network may support a high transmission rate as compared with the CAN and the FlexRay-based network, but there is a difficulty in substantially implementing it because high costs are required to apply the MOST-based network to all networks of the vehicle.

An Ethernet-based network may be considered as a vehicle network that may solve the problems. The Ethernet-based network may support bidirectional communications through a pair of windings, and may support a transmission rate of a maximum of 10 Gbps.

According to some implementations for processing a service of a vehicle controller, static IP addresses may be allocated for services provided by a plurality of applications mounted on the vehicle controller, a table (as an example, a routing rule table), in which access point names that are matched with the static IP addresses are recorded, is provided, and APNs corresponding to the services may be allocated based in the table.

According to such implementations, when a new application is installed in the vehicle controller and a new service is added, an IP address corresponding to the new service and an APN matched with the IP address have to be added to the table, and also, software has to be updated to process the new service.

Consequently, according to the implementations, it may not be suitable and/or easy to add a new service because the IP addresses are static for the services.

The items described in the background art are prepared to promote understanding of the background of the present disclosure, and may include items that are not a conventional technology that is already known to an ordinary person skilled in the art, to which the technology pertains.

SUMMARY

The following summary presents a simplified summary of certain features. The summary is not an extensive overview and is not intended to identify key or critical elements.

An aspect of the present disclosure provides a service processing device of a vehicle controller that may allocate access point names (APNs) and dynamic internet protocol (IP) addresses for services provided by a vehicle controller in a network environment of a vehicle, may, when receiving data of a service having the dynamic IP address from the vehicle controller, deliver the data to an APN corresponding to the dynamic IP address, and may, even when a new application is installed in the vehicle controller and a new service is added, process the new service without having to correct a database, and a method thereof.

Another aspect of the present disclosure provides a service processing device of a vehicle controller that may include a routing rule table, in which access point names (APNs) that are matched for service groups, may, when receiving information on a service from a vehicle controller, determine a group corresponding to the service based on the routing rule table, may allocate a dynamic IP address to the service, and may match the dynamic IP address with the group whereby, even when a new application is installed in the vehicle controller and a new service is added, the new service may be processed without having to correct the routing rule table, and a method thereof.

The objects of the present disclosure are not limited to the above-mentioned objects, and the unmentioned objects and advantages of the present disclosure will be understood by the following description, and will be more apparent with reference to the description of the present disclosure. In addition, it will be understood that the objects and advantages of the present disclosure will be implemented through the features described in the claims and combinations thereof.

A service processing device of a vehicle may comprise: a network interface device comprising a plurality of access point names (APNs) configured to communicate with one or more external computing devices; and a controller configured to: communicate with one or more vehicle controllers of the vehicle; allocate dynamic internet protocol (IP) addresses for services provided by the one or more vehicle controllers, wherein the dynamic IP addresses comprise a first dynamic IP address for a first service provided by a first vehicle controller of the one or more vehicle controllers; map each dynamic IP address of the allocated dynamic IP addresses to a service group associated with at least one of the plurality of APNs, wherein the first dynamic IP address for the first service is mapped to a first service group; and deliver data from the first vehicle controller to a determined APN, of the plurality of APNs, that is associated with the first service group, wherein the data is associated with the first dynamic IP address.

The service processing device may further comprise: a storage configured to store a table, wherein the table indicates mapping information between each service group of a plurality of service groups and at least one of the plurality of APNs.

The controller may be configured to: receiving information on the first service from the first vehicle controller, determining, based on the table, the first service group corresponding to the first service, allocating the first dynamic IP address to the first service, and matching the first dynamic IP address to the first service group.

The first vehicle controller may be configured to deliver, during a booting process of the first vehicle controller, the information on the first service to the controller.

The plurality of service groups may comprise at least one of: a connected car service group, an over the air (OTA) service group, a streaming service group, or a mobility service group.

The storage may store a table, wherein the table indicates: first mapping information between a second service group and at least two APNs of the plurality of APNs; and second mapping information between a third service group and one APN of the plurality of APNs.

The controller may be configured to deliver, based on load statuses of at least two APNs associated with the first service group, the data to the APN of the at least two APNs associated with the first service group.

The controller may be configured to detect data traffics associated with the plurality of APNs, and deliver the data to the determined APN, wherein the determined APN has lower data traffic than data traffic of each of the remaining APNs of the at least two APNs associated with the first service group.

A service processing method of a vehicle may comprise: communicating, by a controller, with at least one vehicle controllers of the vehicle; allocating, by the controller, dynamic internet protocol (IP) addresses for services provided by the one or more vehicle controllers, wherein the dynamic IP addresses comprise a first dynamic IP address for a first service provided by a first vehicle controller of the one or more vehicle controllers; mapping, by the controller, each dynamic IP address of the allocated dynamic IP addresses to a service group associated with at least one of a plurality of access point names (APNs), wherein the first dynamic IP address for the first service is mapped to a first service group; and delivering, by the controller, data from the first vehicle controller to a determined APN, of the plurality of APNs, that is associated with the first service group, wherein the data is associated with the first dynamic IP address.

The method may further comprise: storing, in a storage, a table, wherein the table indicates mapping information between each service group of a plurality of service groups and at least one of the plurality of APNs.

The allocating of the dynamic IP addresses may comprise: receiving, by the controller, information on the first service from the first vehicle controller; determining, by the controller and based on the table, the first service group corresponding to the first service; and allocating, by the controller, the first dynamic IP address to the first service.

The method may further comprise: matching, by the controller, the first dynamic IP address to the first service group.

The receiving of the information on the first service may comprise: during a booting process of the first vehicle controller, receiving, from the first vehicle controller, the information on the first service.

The plurality of service groups may comprise at least one of: a connected car service group, an over the air (OTA) service group, a streaming service group, or a mobility service group.

The table may indicate: first mapping information between a second service group and at least two APNs of the plurality of APNs; and second mapping information between a third service group and one APN of the plurality of APNs.

The delivering of the data may comprise: delivering, based on load statuses of at least two APNs associated with the first service group, the data to the determined APN of the at least two APNs associated with the first service group.

The delivering of the data may comprise: detecting data traffics associated with the plurality of APNs; and delivering, by the controller, the data to the determined APN, wherein the determined APN has lower data traffic than data traffic of each of the remaining APNs of the at least two APNs associated with the first service group.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
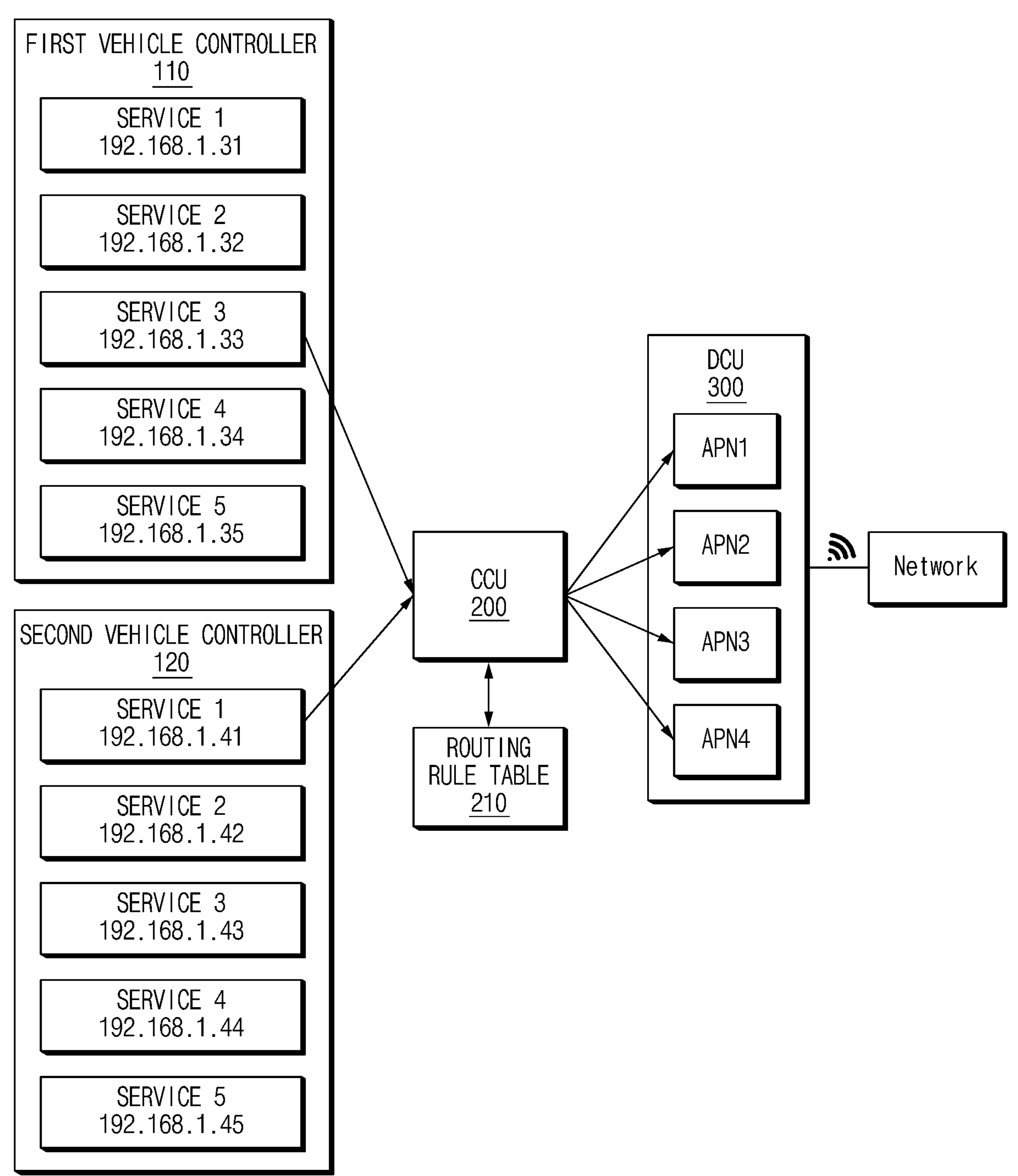
FIG. 1 is an exemplary view of a network environment of a vehicle.

Hereinafter, various features and examples of the present disclosure will be described in detail with reference to the accompanying drawings. In adding reference numerals to the components of the drawings, it is noted that the same components are denoted by the same reference numerals even when they are drawn in different drawings. Furthermore, in describing various aspects of the present disclosure, when it is determined that a detailed description of related known configurations and functions may hinder understanding of the features of the present disclosure, a detailed description thereof will be omitted.

Furthermore, in describing the components of the embodiments of the present disclosure. terms, such as first, second, “A”, “B”, (a), and (b) may be used. The terms are simply for distinguishing the components, and the essence, the sequence, and the order of the corresponding components are not limited by the terms. When it is described that a component is “connected to”, “fastened to”, or “inserted into” another component, it should be understood that the former component may be directly connected to, fastened to, or connected to the latter component, but a third component may be “connected”, “fastened”, or “inserted” between the components. The generally used terms such as the terms defined in advance should be construed to coincide with the context meanings of the related technologies, and should not be construed as ideal or excessively formal meanings unless defined explicitly in the present disclosure.

FIG. 1 is an exemplary view of a network environment of a vehicle.

As illustrated in FIG. 1, a network environment (or system) of a vehicle may include a first vehicle controller 110, a second vehicle controller 120, a central communication unit (CCU) 200, a routing rule table 210, and a data connectivity unit (DCU) 300. The CCU 200 (e.g., including a router, a gateway, a controller, etc.) may include one or more processors, one or more communication interfaces, and storage devices. The DCU 300 (e.g., including a network interface device, etc.) may include one or more processors, one or more communication interfaces, and storage devices.

Each vehicle controller may comprise one or more applications configured to provide one or more services associated with the vehicle, for example, via wireless communication via a wireless network. Each of the one or more services may be categorized into one of a plurality of service groups. Each service group may be associated with different QoS requirements and/or different service requirements (e.g., including different network policies, different payment plans, etc.). A vehicle controller may send information of a service type for each service provided by the vehicle controller.

The DCU 300 may comprise one or more SIM cards associated with one or more respective mobile communication service providers.

The first vehicle controller 110 and the second vehicle controller 120, as an example, may be connected to the CCU 200 through a communication interface, such as an Ethernet switch. The first vehicle controller 110 may provide service 1, in which a dynamic IP address (as an example, 192.168.1.31) is allocated from the CCU 200, service 2, in which a dynamic IP address (as an example, 192.168.1.32) is allocated from the CCU 200, service 3, in which a dynamic IP address (as an example, 192.168.1.33) is allocated from the CCU 200, service 4, in which a dynamic IP address (as an example, 192.168.1.34) is allocated from the CCU 200, and service 5, in which a dynamic IP address (as an example, 192.168.1.35) is allocated from the CCU 200. Furthermore, the second vehicle controller 120 may provide service 1, in which a dynamic IP address (as an example, 192.168.1.41) is allocated from the CCU 200, service 2, in which a dynamic IP address (as an example, 192.168.1.42) is allocated from the CCU 200, service 3, in which a dynamic IP address (as an example, 192.168.1.43) is allocated from the CCU 200, service 4, in which a dynamic IP address (as an example, 192.168.1.44) is allocated from the CCU 200, and service 5, in which a dynamic IP address (as an example, 192.168.1.45) is allocated from the CCU 200.

The CCU 200 may be implemented to include a service processing device of a vehicle controller, and/or may be implemented to perform a function of a service processing device of a vehicle controller.

The CCU 200 may include a gateway that performs a routing function on the network of the vehicle, and also may route data (as an example, packets) based on the routing rule table 210. The routing rule table 210 may be a table, in which access point names (APNs) that are matched with service groups are recorded. As an example, a plurality of services included in service 1 group may be matched with a first APN APN1, and a plurality of services included in service 2 group may be matched with a second APN APN2, etc.

The CCU 200 may receive information (as an example, type information of a service) on a service from the vehicle controllers 110 and 120 (e.g., during booting of the vehicle controllers 110 and 120), may determine a group corresponding to the service based on the routing rule table 210, may allocate a dynamic IP address to the service, and may match the dynamic IP address with the group corresponding to the service. The CCU 200 may record the dynamic IP address allocated for the service groups on the routing rule table 210. The routing rule table 210 may be updated if one or more new services are added in at least one of the vehicle controllers.

When receiving data of a service having a dynamic IP address from the vehicle controllers 110 and 120, the CCU 200 may determine a service group that is matched with the dynamic IP address, may determine an APN corresponding to the determined service group, and may deliver the data to the determined APN.

The DCU 300 may be connected to the CCU 200 (e.g., through an L2 bridge physical layer PHY), and may deliver data (as an example, packets) from the vehicle controllers 110 and 120 to an external network. The DCU 300 may include a plurality of APNs, and the APNs may communicate with an external server. As an example, APN 1 may communicate with a first external server, APN 2 may communicate with a second external server, and APN 3 may communicate with a third external server, etc.

Figure 2:
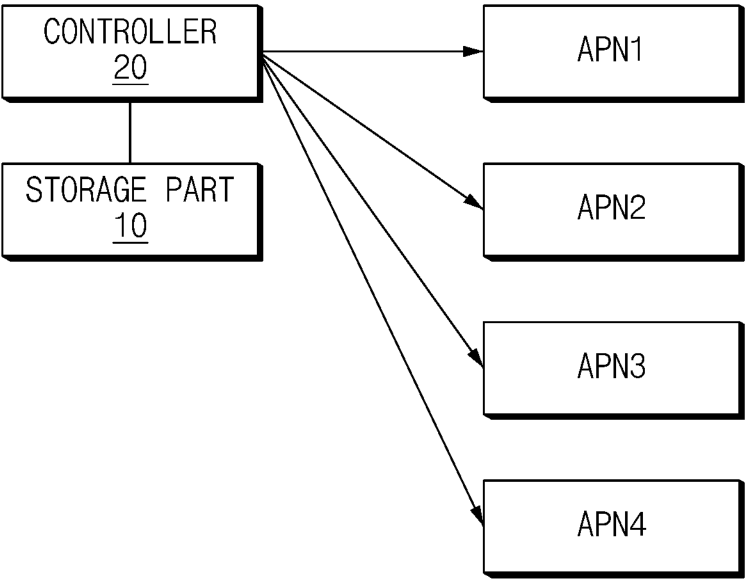
FIG. 2 is a diagram of a service processing device of a vehicle controller.

FIG. 2 is a diagram of the service processing device of a vehicle controller.

As illustrated in FIG. 2, the service processing device of a vehicle controller may include a storage part 10 and a controller 20. According to a scheme of carrying out the service processing device of a vehicle controller, the components may be coupled to each other to be implemented as one, and some components may be omitted.

The storage part 10 may store various logic, algorithms, and programs that are required in a process of allocating access point names (APNs) and dynamic IP addresses for services provided by the vehicle controllers 110 and 120 in a network environment of the vehicle, and when receiving data of a service having the dynamic IP address from the vehicle controllers 110 and 120, delivering the data to an APN corresponding to the dynamic IP address. The number of the APNs may be changed according to a desired configuration.

The storage part 10 may store the routing rule table 210 (see FIG. 3), in which the access point names (APN) matched with the service groups are recorded. The routing rule table 210, as an example, is as illustrated in FIG. 3.

Figure 3:
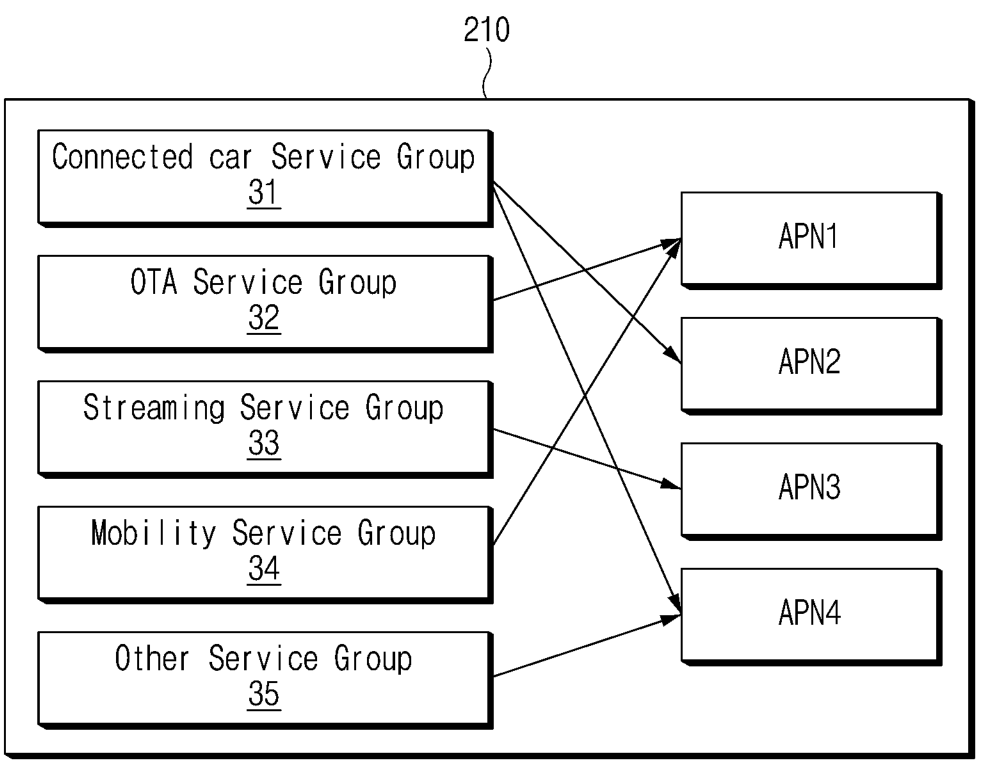
FIG. 3 is an exemplary view of a routing rule table stored in a storage part provided in a service processing device of a vehicle controller.

FIG. 3 is an exemplary view of a routing rule table stored in a storage part provided in the service processing device of a vehicle controller.

As illustrated in FIG. 3, the routing rule table 210 stored in the storage part 10 provided in the service processing device of a vehicle controller may include, as a service group, a connected car service group 31, an over the air (OTA) service group 32, a streaming service group 33, a mobility service group 34, and other service groups 35. Here, only some of example service groups are illustrated for understanding, and service groups may be added and deleted according to a desired configuration.

A plurality of services included in the connected car service group 31 may be allocated to APN 2 or APN 4, a plurality of services included in the OTA service group 32 may be allocated to APN 1, a plurality of services (as an example, a video service or an audio service) included in the streaming service group 33 may be allocated to APN 3, a plurality of services included in the mobility service group 34 may be allocated to APN 1, and a plurality of services included in the other service groups 35 may be allocated to APN 4.

If information on a service is received from the vehicle controllers 110 and 120, the storage part 10 may store various logic, algorithms, and programs that are required in a process of determining a group corresponding to the service based on the routing rule table 210 that is stored in advance, allocating a dynamic IP address to the service, and matching the dynamic IP address to a group corresponding to the service.

The storage part 10 may include a storage medium of at least one type of a memory, such as a flash memory type, a hard disk type, a micro type, a card type (as an example, a secure digital (SD) card or an eXtream digital (XD) card), and a random access memory (RAN), a static RAM (SRAM), a read-only memory (ROM), a programmable ROM (PROM), an electrically erasable PROM (EEPROM), a magnetic RAM (MRAM), a magnetic disk, and an optical disk type.

The controller 20 may perform an overall control such that the components may normally perform their functions. The controller 20 may be implemented in a form of hardware, may be implemented in a form of software, or may be implemented in a form, in which hardware and software are combined. In some implementations, the controller 20 may be implemented by a microprocessor, but aspects of the present disclosure are not limited thereto.

The controller 20 may allocate access point names (APNs) and dynamic internet protocol (IP) addresses for services provided by the vehicle controllers 110 and 120 in a network environment of the vehicle and, when receiving data of a service having a dynamic IP address from the vehicle controllers 110 and 120, may deliver the data to an APN corresponding to the dynamic IP address.

The controller 20 may receive information (as an example, type information of a service) on a service from the vehicle controllers 110 and 120 (e.g., during booting of the vehicle controllers 110 and 120), may determine a group corresponding to the service based on the routing rule table 210, may allocate a dynamic IP address to the service, and may match the dynamic IP address with the group corresponding to the service. The controller 20 may record the dynamic IP addresses allocated for the service groups on the routing rule table 210.

If data of a service having a dynamic IP address is received from the vehicle controllers 110 and 120, the controller 20 may determine a service group that is matched with the dynamic IP address, may determine an APN corresponding to the determined service group, and may deliver the data to the determined APN.

Hereinafter, referring to FIGS. 4 and 5, an operation of the controller 20 will be discussed in detail.

Figure 4:
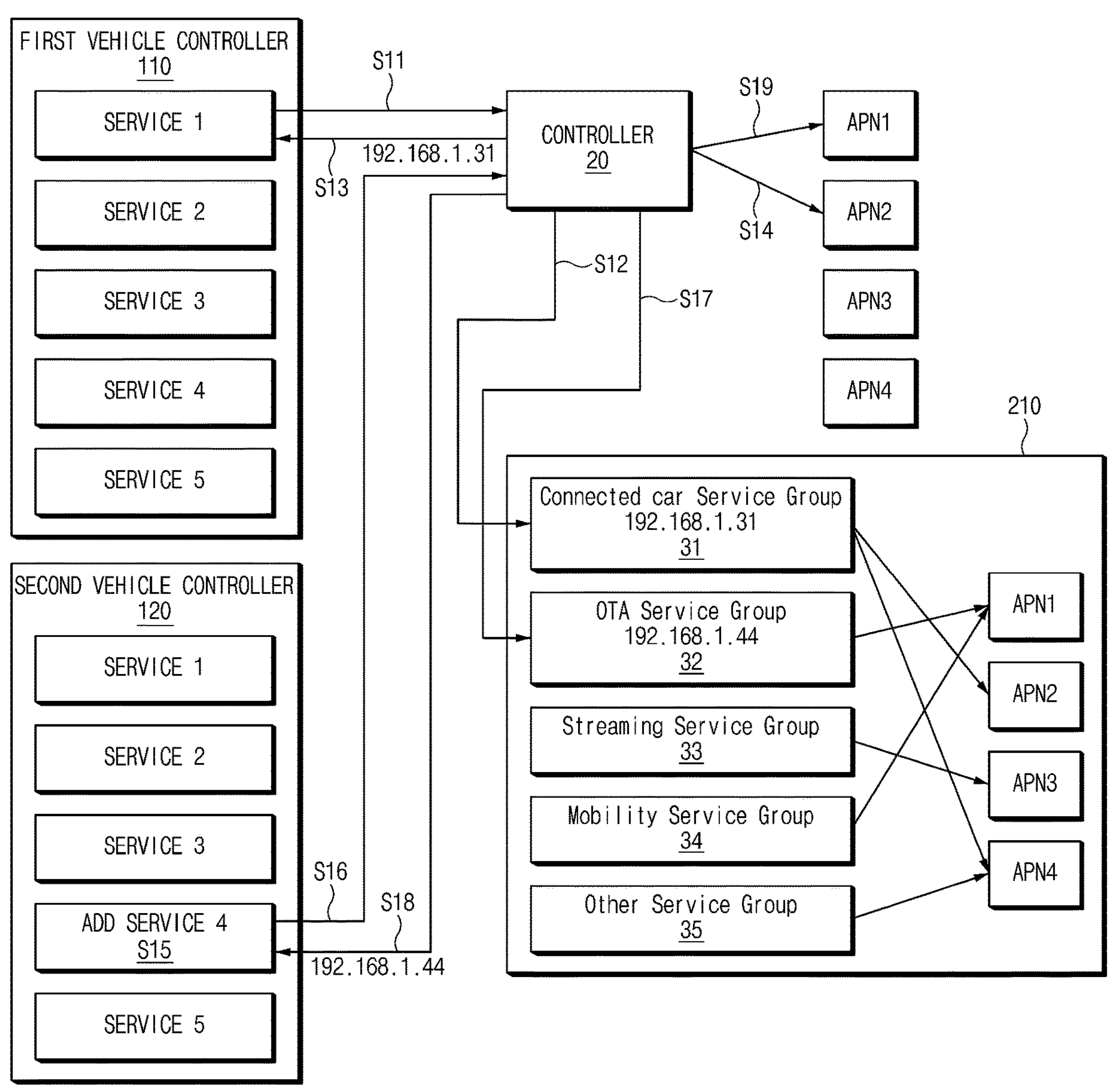
FIG. 4 is an exemplary view illustrating a process of, by a controller, processing a service in a service processing device of a vehicle controller.

FIG. 4 is an exemplary view illustrating a process of, by the controller, processing a service in the service processing device of a vehicle controller.

In process S11, the first vehicle controller 110 may deliver information (as an example, type information of a service) on service 1 during booting thereof.

In process S12, the controller 20 may determine a group corresponding to service 1 based on the routing rule table 210 stored in the storage part 10. The group corresponding to service 1 may be the connected car service group 31.

In process S13, the controller 20 may allocate a dynamic IP address (as an example, 192.168.1.31) to service 1. The controller 20 may match the allocated dynamic IP address with the connected car service group 31 corresponding to service 1. Furthermore, the controller 20 may record the matching information in the routing rule table 210.

In process S14, for receiving data of a service having a dynamic IP address (as an example, 192.168.1.31) from the first vehicle controller 110, the controller 20 may determine the connected car service group 31 as a service group matched with the dynamic IP address, may determine APN 2 as an APN corresponding to the connected car service group 31, and may deliver the data to APN 2.

In process S15, new service 4 may be added to the second vehicle controller 120.

In process S16, the second vehicle controller 120 may deliver information on service 4 during booting thereof.

In process S17, the controller 20 may determine a group corresponding to service 4 based on the routing rule table 210 stored in the storage part 10. The group corresponding to service 4 may be the OTA service group 32.

In process S18, the controller 20 may allocate a dynamic IP address (as an example, 192.168.1.44) to service 4. The controller 20 may match the allocated dynamic IP address with the OTA service group 32 corresponding to service 4. Furthermore, the controller 20 may record the matching information in the routing rule table 210.

In process S19, for receiving data of a service having a dynamic IP address (as an example, 192.168.1.44) from the second vehicle controller 120, the controller 20 may determine the OTA service group 32 as a service group matched with the dynamic IP address, may determine APN 1 as an APN corresponding to the OTA service group 32, and may deliver the data to APN 1.

Figure 5:
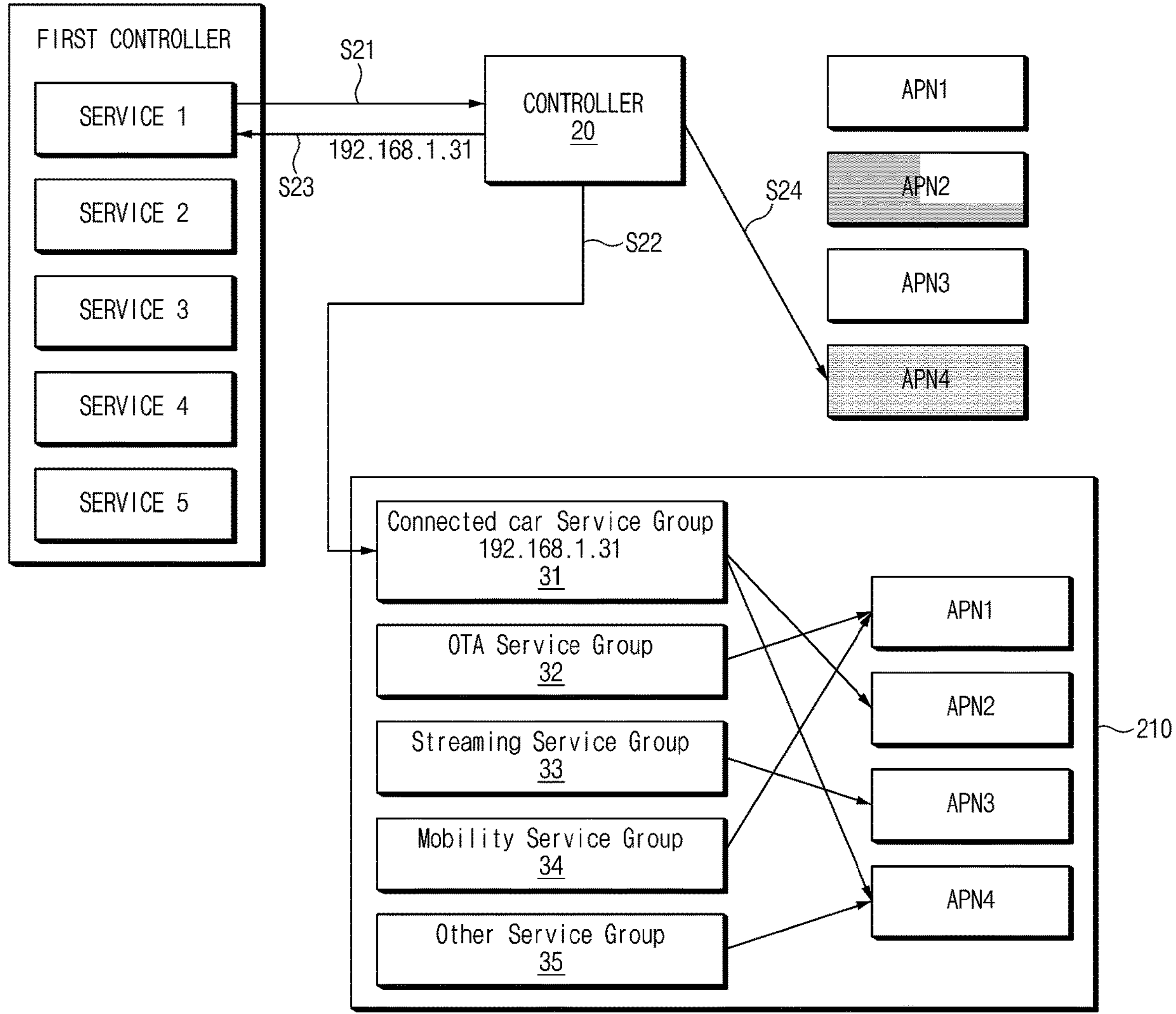
FIG. 5 is another exemplary view illustrating a process of, by a controller, processing a service in a service processing device of a vehicle controller.

FIG. 5 is another exemplary view illustrating a process of, by the controller, processing a service in the service processing device of a vehicle controller.

In process S21, the first vehicle controller 110 may deliver information (as an example, type information of a service) on service 1 to the controller 20 during booting thereof.

In process S22, the controller 20 may determine a group corresponding to service 1 based on the routing rule table 210 stored in the storage part 10. The group corresponding to service 1 may be the connected car service group 31.

In process S23, the controller 20 may allocate a dynamic IP address (as an example, 192.168.1.31) to service 1. The controller 20 may match the allocated dynamic IP address with the connected car service group 31 corresponding to service 1. Furthermore, the controller 20 may record the matching information in the routing rule table 210.

In process S24, for receiving data of a service having a dynamic IP address (as an example, 192.168.1.31) from the first vehicle controller 110, the controller 20 may determine the connected car service group 31 as a service group matched with the dynamic IP address. The controller 20 may determine, among APN 2 and APN 4 corresponding to the connected car service group 31, APN 4 having a low data traffic, as an APN corresponding to the connected car service group 31, and may deliver the data to APN 4. Here, because a data traffic of APN 2 is high as compared with the data traffic of APN 4, a transmission delay or loss of data may occur.

Figure 6:
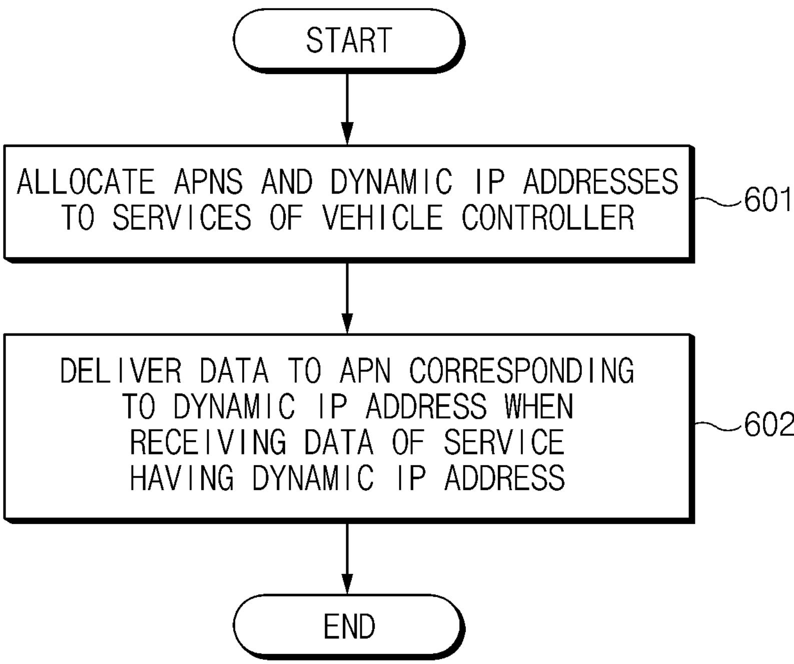
FIG. 6 is a flowchart of a service processing method of a vehicle controller.

FIG. 6 is a flowchart of a service processing method of a vehicle controller.

The controller 20 may allocate access point names (APNs) and dynamic internet protocol (IP) addresses to the services of the vehicle controllers 110 and 120 (601). The controller 20 may include a table, in which the APNs matched with the service groups and may receive information of a service from the vehicle controllers 110 and 120, and thus may determine a group corresponding to the service based on the table, may allocate a dynamic IP address to the service, and may match the dynamic IP address with the group.

For receiving data of a service having the dynamic IP address, the controller may deliver the data to an APN corresponding to the dynamic IP address (602).

According to an aspect of the present disclosure, a service processing device of a vehicle controller includes a plurality of access point names (APNs) configured to communicate with a server, and a controller configured to allocate APNs and dynamic internet protocol (IP) addresses for services provided by the vehicle controller and to deliver data to an APN corresponding to the dynamic IP address when receiving the data of a service having the dynamic IP address.

The service processing device may further include a storage part that stores a table, in which APNs matched with service groups are recorded.

The controller may receive information on the service from the vehicle controller, may determine a group corresponding to the service based on the table, may allocate a dynamic IP address to the service, and may match the dynamic IP address to the group corresponding to the service.

The vehicle controller may deliver the information on the service to the controller during booting thereof.

The service group may include at least one of a connected car service group, an over the air (OTA) service group, a streaming service group, a mobility service group, or other service groups.

The storage part may store a table, in which the connected car service group is matched with APN 2 and APN 2, the OTA service group is matched with APN 1, the streaming service group is matched with APN 3, the mobility service group is matched with APN 1, and the other service groups are matched with APN 4.

The controller may deliver the data to APN 2 or APN 4 when the service is included in the connected car service.

The controller may, when the service is included in the connected car service group, detect a data traffic of APN 2 and a data traffic of APN 4, and when the data traffic of APN 4 is lower than the data traffic of APN 2, may deliver the data to APN 4.

According to another aspect of the present disclosure, a service processing method of a vehicle controller includes allocating, by a controller, access point names (APNs) and dynamic internet protocol (IP) addresses for services provided by a vehicle controller, and delivering, by the controller, data to an APN corresponding to a dynamic IP address when receiving the data of a service having the dynamic IP address.

The service processing method may further include storing, by a storage part, a table, in which the APNs matched with service groups are recorded.

The allocating of the APNs and the dynamic IP addresses to the services of the vehicle controller may include receiving, by the controller, information on the service from the vehicle controller, determining, by the controller, a group corresponding to the service based on the table, and allocating, by the controller, a dynamic IP address to the service.

The allocating of the APNs and the dynamic IP addresses to the services of the vehicle controller may further include matching, by the controller, the dynamic IP address with a group corresponding to the service.

The receiving of the information on the service may include delivering, by the vehicle controller, the information on the service to the controller during booting of the vehicle controller.

The storing the table may include storing a table, in which the connected car service group is matched with APN 2 and APN 2, the OTA service group is matched with APN 1, the streaming service group is matched with APN 3, the mobility service group is matched with APN 1, and the other service groups are matched with APN 4.

The delivering of the data to the APN may include delivering the data to APN 2 or APN 4 when the service is included in the connected car service.

The delivering of the data to the APN may include, when the service is included in the connected car service group, detecting, by the controller, a data of APN 2 and a data traffic of APN 4, and, when the data traffic of APN 4 is lower than the data traffic of APN 2, delivering, by the controller, the data to APN 4.

Figure 7:
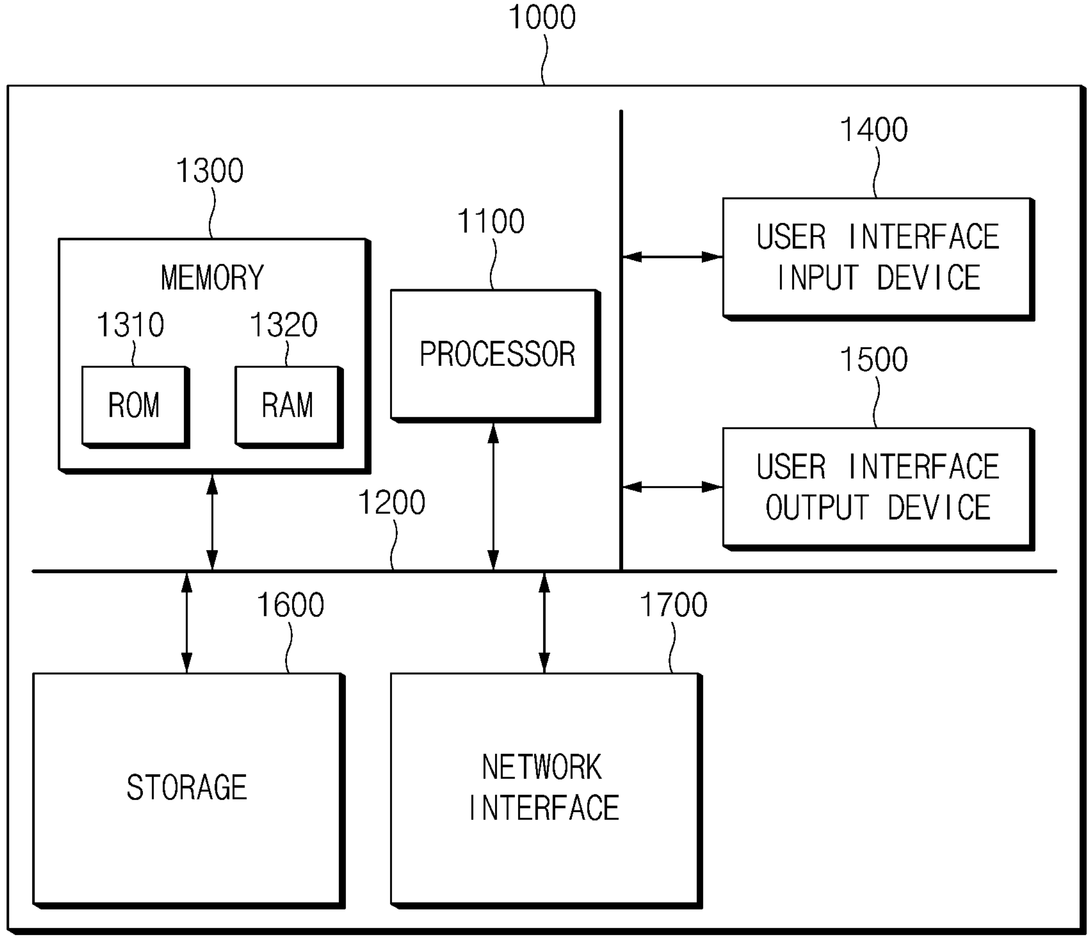
FIG. 7 is a block diagram illustrating a computing system for executing a service processing method of a vehicle controller.

FIG. 7 is a block diagram illustrating a computing system for executing the service processing method of a vehicle controller.

Referring to FIG. 7, the service processing method of a vehicle controller may also be implemented through a computing system 1000. The computing system 1000 may include at least one processor 1100, a memory 1300, a user interface input device 1400, a user interface output device 1500, a storage 1600, and a network interface 1700, which are connected through a system bus 1200.

The processor 1100 may be a central processing unit (CPU), or a semiconductor device that processes instructions stored in the memory 1300 and/or the storage 1600. The memory 1300 and the storage 1600 may include various kinds of volatile or nonvolatile storage media. The memory 1300 and the storage 1600 may include various volatile or nonvolatile storage media. As an example, the memory 1300 may include a read only memory (ROM) 1310 and a random access memory (RAM) 1320.

Accordingly, the steps of the method or algorithm described in relation to the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to one or more aspects of the present disclosure, access point names (APNs) and dynamic internet protocol (IP) addresses may be allocated for services provided by a vehicle controller in a network environment of a vehicle, when data of a service having the dynamic IP address are received from the vehicle controller, the data may be delivered to an APN corresponding to the dynamic IP address, and even when a new application is installed in the vehicle controller and a new service is added, the new service may be processed without having to correct a database.

According to one or more aspects of the present disclosure, a routing rule table, in which access point names (APNs) that are matched for service groups, may be included, when information on a service from a vehicle controller is received, a group corresponding to the service based on the routing rule table may be determined, and a dynamic IP address to the service may be allocated, and the dynamic IP address may be matched with the group whereby, even when a new application is installed in the vehicle controller and a new service is added, the new service may be processed without having to correct the routing rule table.

The above description is a simple exemplification of the technical spirits of the present disclosure, and one of more implementations according to the present disclosure may be variously modified by those skilled in the art to which the present disclosure pertains without departing from the essential features of the present disclosure. Accordingly, the example features disclosed in the present disclosure are not intended to limit the technical spirits of the present disclosure but to help one of ordinary skill in the art to implement various aspects of the present disclosure. Further, the scope of the technical spirits of the present disclosure is not limited by the examples described herein. Accordingly, the genuine technical scope of the present disclosure should be construed by the attached claims, and all the technical spirits within the equivalent ranges fall within the scope of the present disclosure.

What is claimed is:

1. A service processing device of a vehicle, the service processing device comprising:

a network interface device comprising a plurality of access point names (APNs) configured to communicate with one or more external computing devices;

a storage configured to store a table indicating mapping information between each service group of a plurality of service groups and at least one of the plurality of APNs; and a controller configured to:

communicate with one or more vehicle controllers of the vehicle;

allocate dynamic internet protocol (IP) addresses for services provided by the one or more vehicle controllers, wherein the dynamic IP addresses comprise a first dynamic IP address for a first service of at least two services provided by a first vehicle controller of the one or more vehicle controllers;

map each dynamic IP address of the allocated dynamic IP addresses to a service group associated with at least one of the plurality of APNs, wherein the first dynamic IP address for the first service is mapped to a first service group; and deliver data from the first vehicle controller to a determined APN, of the plurality of APNs, that is associated with the first service group, wherein the data is associated with the first dynamic IP address, wherein the determined APN is determined among the plurality of APNs based on a data traffic status of the plurality of APNs, and wherein the mapping information comprises:

first mapping information between a second service group and at least two APNs of the plurality of APNs, and second mapping information between a third service group and one APN of the plurality of APNs, wherein the one or more vehicle controllers comprise a plurality of vehicle controllers, wherein the first vehicle controller is configured with a first plurality of services, wherein a second service of the first plurality of services belongs to the second service group, wherein a second vehicle controller of the plurality of vehicle controllers is configured with a second plurality of services, wherein a first service of the second plurality of services belongs to the first service group, and wherein a second service of the second plurality of services belongs to the third service group.

2. The service processing device of claim 1, wherein the controller is configured to:

receive information on the first service from the first vehicle controller, determine, based on the table, the first service group corresponding to the first service, allocate the first dynamic IP address to the first service, and match the first dynamic IP address to the first service group.

3. The service processing device of claim 2, wherein the first vehicle controller is configured to deliver, during a booting process of the first vehicle controller, the information on the first service to the controller.

4. The service processing device of claim 1, wherein the plurality of service groups comprises at least one of:

a connected car service group, an over the air (OTA) service group, a streaming service group, or a mobility service group.

5. The service processing device of claim 1, wherein the controller is configured to deliver, based on load statuses of at least two APNs associated with the first service group, the data to the APN of the at least two APNs associated with the first service group.

6. The service processing device of claim 5, wherein the controller is configured to detect data traffics associated with the plurality of APNs, and deliver the data to the determined APN, wherein the determined APN has lower data traffic than data traffic of each of the remaining APNs of the at least two APNs associated with the first service group.

7. The service processing device of claim 1, wherein the vehicle comprises the plurality of vehicle controllers, wherein each service of the first plurality of services belongs to at least one service group of the plurality of service groups, and wherein each service of the second plurality of services belongs to at least one service group of the plurality of service groups.

8. The service processing device of claim 1, wherein the controller is configured to add a second service for the first vehicle controller, wherein the second service belongs to the third service group, wherein the first dynamic IP address for the first service is assigned for the first service group, and wherein a second dynamic IP address for the second service for the first vehicle controller is assigned for the third service group.

9. The service processing device of claim 8, wherein the controller is configured to allocate a third dynamic IP address for the second service for the first vehicle controller, wherein the second service belongs to the third service group, and wherein the second dynamic IP address is replaced with the third dynamic IP address for the third service group.

10. A service processing method of a vehicle, the service processing method comprising:

storing, in a storage, a table indicating mapping information between each service group of a plurality of service groups and at least one of a plurality of access point names (APNs);

communicating, by a controller, with at least one vehicle controllers of the vehicle;

allocating, by the controller, dynamic internet protocol (IP) addresses for services provided by the one or more vehicle controllers, wherein the dynamic IP addresses comprise a first dynamic IP address for a first service of at least two services provided by a first vehicle controller of the one or more vehicle controllers;

mapping, by the controller, each dynamic IP address of the allocated dynamic IP addresses to a service group associated with at least one of the plurality of APNs, wherein the first dynamic IP address for the first service is mapped to a first service group; and delivering, by the controller, data from the first vehicle controller to a determined APN, of the plurality of APNs, that is associated with the first service group, wherein the data is associated with the first dynamic IP address, wherein the determined APN is determined among the plurality of APNs based on a data traffic status of the plurality of APNs, and wherein the mapping information comprises:

first mapping information between a second service group and at least two APNs of the plurality of APNs, and second mapping information between a third service group and one APN of the plurality of APNs, wherein the one or more vehicle controllers comprise a plurality of vehicle controllers, wherein the first vehicle controller is configured with a first plurality of services, wherein a second service of the first plurality of services belongs to the second service group, wherein a second vehicle controller of the plurality of vehicle controllers is configured with a second plurality of services, wherein a first service of the second plurality of services belongs to the first service group, and wherein a second service of the second plurality of services belongs to the third service group.

11. The service processing method of claim 10, wherein the allocating of the dynamic IP addresses comprises:

receiving, by the controller, information on the first service from the first vehicle controller;

determining, by the controller and based on the table, the first service group corresponding to the first service; and allocating, by the controller, the first dynamic IP address to the first service.

12. The service processing method of claim 11, further comprising:

matching, by the controller, the first dynamic IP address to the first service group, wherein the first service group comprises a plurality of services, wherein a first service of the plurality of services of the first service group is provided by the first vehicle controller, and wherein a second service of the plurality of services of the first service group is provided by another vehicle controller.

13. The service processing method of claim 11, wherein the receiving of the information on the first service comprises:

during a booting process of the first vehicle controller, receiving, from the first vehicle controller, the information on the first service.

14. The service processing method of claim 10, wherein the plurality of service groups comprises at least one of:

a connected car service group, an over the air (OTA) service group, a streaming service group, or a mobility service group.

15. The service processing method of claim 10, wherein the delivering of the data comprises:

delivering, based on load statuses of at least two APNs associated with the first service group, the data to the determined APN of the at least two APNs associated with the first service group.

16. The service processing method of claim 15, wherein the delivering of the data comprises:

detecting data traffics associated with the plurality of APNs; and delivering, by the controller, the data to the determined APN, wherein the determined APN has lower data traffic than data traffic of each of the remaining APNs of the at least two APNs associated with the first service group.

17. The service processing method of claim 10, wherein the vehicle comprises the plurality of vehicle controllers, wherein each service of the first plurality of services belongs to at least one service group of the plurality of service groups, and wherein each service of the second plurality of services belongs to at least one service group of the plurality of service groups.

18. The service processing method of claim 10, further comprising:

adding a second service for the first vehicle controller, wherein the second service belongs to the third service group, wherein the first dynamic IP address for the first service is assigned for the first service group, and wherein a second dynamic IP address for the second service for the first vehicle controller is assigned for the third service group.

* * * * *